(12) United States Patent
Murakami et al.

(10) Patent No.: US 8,896,634 B2
(45) Date of Patent: Nov. 25, 2014

(54) INFORMATION-PROCESSING DEVICE AND PROGRAM

(75) Inventors: Keiichi Murakami, Tokyo (JP); Naoki Hashida, Tokyo (JP); Kazuhiro Yamada, Tokyo (JP); Izua Kano, Tokyo (JP); Dai Kamiya, Tokyo (JP); Yasushi Onda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 917 days.

(21) Appl. No.: 13/062,003

(22) PCT Filed: Sep. 8, 2009

(86) PCT No.: PCT/JP2009/065676
§ 371 (c)(1),
(2), (4) Date: Mar. 3, 2011

(87) PCT Pub. No.: WO2010/027086
PCT Pub. Date: Mar. 11, 2010

(65) Prior Publication Data
US 2011/0164048 A1    Jul. 7, 2011

(30) Foreign Application Priority Data

Sep. 8, 2008  (JP) .................................. 2008-230240

(51) Int. Cl.
*G09G 5/00* (2006.01)
*G06F 9/44* (2006.01)
*G06F 3/0481* (2013.01)
*G09G 5/14* (2006.01)

(52) U.S. Cl.
CPC .......... *G09G 5/14* (2013.01); *G09G 2340/0464* (2013.01); *G06F 9/4443* (2013.01); *G06F 3/0481* (2013.01)
USPC ...................................................... 345/672

(58) Field of Classification Search
CPC ..... G06F 3/0481; G06F 17/00; G06F 9/4443; G06F 3/14; G09G 2340/0464; G09G 5/14; G06T 11/001; G06T 15/04; G06T 15/005
See application file for complete search history.

(56) References Cited

U.S. PATENT DOCUMENTS

2004/0102224 A1* 5/2004 Lee .............................. 455/566
2004/0141008 A1   7/2004 Jarczyk et al.
(Continued)

FOREIGN PATENT DOCUMENTS

JP    06-266524    9/1994
JP    2000-039948    2/2000
(Continued)

OTHER PUBLICATIONS

European Patent Application No. 09811609.8; Supplementary EP Search Report dated Nov. 29, 2011.
(Continued)

*Primary Examiner* — Kee M Tung
*Assistant Examiner* — Frank Chen
(74) *Attorney, Agent, or Firm* — MKG, LLC

(57) ABSTRACT

An information-processing device comprises: a reception means for receiving an instruction to display an object image(s) on a display means for displaying an image, via an operation means for receiving an operation; a determination means for determining a number of the object image(s) when the object image(s) is displayed on the display means in response to the instruction; and a display control means for, in a case where the number determined by the determination means is equal to or larger than three and equal to or smaller than a threshold value, arranging and displaying the object images at positions such that, when points respectively determined in adjacent object images are connected by line segments, a figure formed by the line segments represents a polygon having a number of vertices corresponding to the determined number, and, in a case where the number determined by the determination means exceeds the threshold value, arranging and displaying the object images in rows extending in a predetermined direction in a display area of the display means.

7 Claims, 14 Drawing Sheets

(56) References Cited

U.S. PATENT DOCUMENTS

2008/0115081 A1 5/2008 Sankaravadivelu et al.
2012/0254742 A1* 10/2012 Hitaka et al. .................. 715/255

FOREIGN PATENT DOCUMENTS

JP 2007-323618 12/2007
JP 2008-084251 4/2008

OTHER PUBLICATIONS

International Search Report; International Application No. PCT/JP2009/065676; Date Mailed Dec. 22, 2009.

Office Action for corresponding Chinese Application No. 200980135024.5 dated Apr. 2, 2013.
Office Action for corresponding Chinese Application No. 200980135024.5 dated Aug. 15, 2013.
Office Action (with English translation) for Japanese Patent Application No. 2008-230240 dated Oct. 2, 2012.
Office Action for European Patent Application No. 09811609.8-1228 dated Apr. 17, 2012.
Third Notification of Office Action issued in Chinese Patent Application No. 200980135024.5. dated Mar. 19, 2014, with English translation.

* cited by examiner

FIG. 5
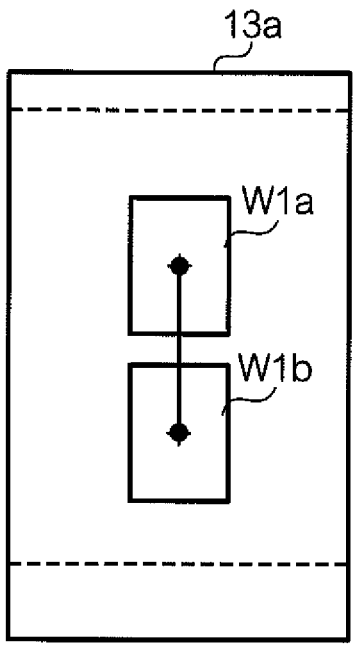
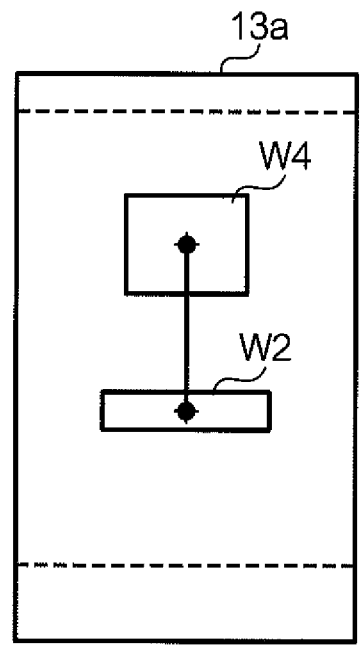
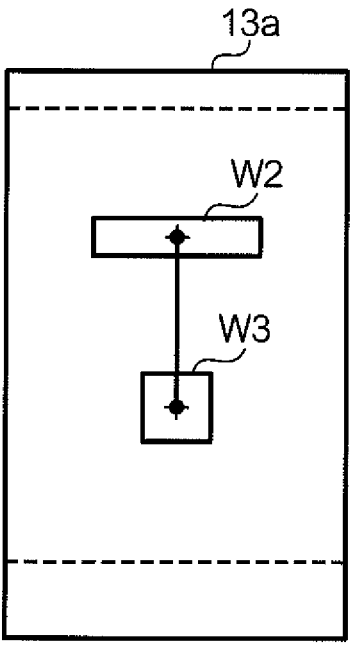
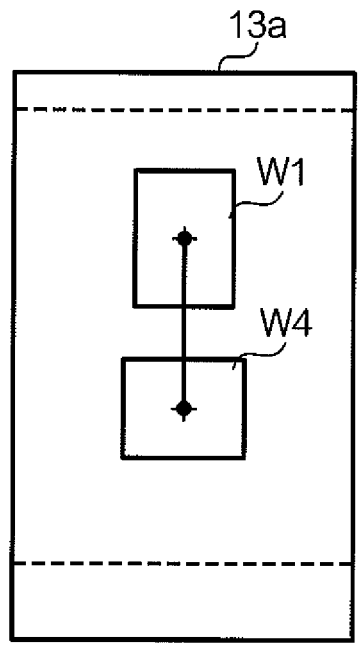

INFORMATION-PROCESSING DEVICE AND PROGRAM

TECHNICAL FIELD

The present invention relates to a GUI (Graphical User Interface).

BACKGROUND

A multi-window system, namely, a system that can allow multiple windows to be displayed, is known. Patent Publications 1 and 2 disclose a technology for determining an arrangement of windows in a multi-window system. In the technology disclosed in Patent Publications 1 and 2, windows are arranged according to a predetermined algorithm based on a size (area) of each of the windows displayed and a number of the windows, so as to improve viewability and operability of the windows.

In a case where a multi-window system is applied to an electronic device whose display area is generally small, such as a mobile phone or the like, if the windows are displayed such that each window has a size that allows it to be viewed easily by a user, a part of the window(s) may not be contained within the display area. To avoid such a situation, it is conceivable, for example, to arrange the windows from an upper part to a lower part of the display area while positioning the windows as close to one another as possible. However, this will restrict the windows to being positioned regularly or uniformly, resulting in poor layout design of the windows and a less attractive UI (User Interface) from a user's viewpoint.

An object of the present invention is, in a case where multiple images such as windows or the like are displayed, to improve the layout design of the displayed images, and to ensure that the images are contained within a display area when a number of images displayed is large.

SUMMARY

An image-processing device according to one aspect of the present invention comprises: a reception means for receiving an instruction to display an object image(s) on a display means for displaying an image, via an operation means for receiving an operation; a determination means for determining a number of the object image(s) when the object image(s) is displayed on the display means in response to the instruction; and a display control means for, in a case where the number determined by the determination means is equal to or larger than three and equal to or smaller than a threshold value, arranging and displaying the object images at positions such that, when points respectively determined in adjacent object images are connected by line segments, a figure formed by the line segments represents a polygon having a number of vertices corresponding to the determined number, and, in a case where the number determined by the determination means exceeds the threshold value, arranging and displaying the object images in rows extending in a predetermined direction in a display area of the display means.

In an image-processing device according to one aspect of the present invention, when a predetermined number or more of object images having a direction of elongation are displayed in the case where the number determined by the determination means is equal to or larger than three and is equal to or smaller than the threshold value, the display control means may arrange and display the object images in a row(s) along a predetermined direction in the display area of the display means, instead of arranging the object images at such positions that the object images form a polygon, and when a predetermined number or more of object images having a direction of elongation are displayed in the case where the number determined by the determination means exceeds the threshold value, the display control means may arrange and display the object images having a direction of elongation in a row(s) along a predetermined direction in the display area of the display means, and arranges and displays the other object image(s) in a row(s) along the predetermined direction separately from the object images having a direction of elongation.

In an image-processing device according to one aspect of the present invention, in a case where the number determined by the determination unit is equal to or larger than four and is equal to or smaller than the threshold value, the display control means may arrange and display three or more object images at positions such that, when points predetermined in the three or more object images are connected by line segments, a figure formed by the line segments represents a polygon having a number of vertices same as the number of the three or more object images, and arranges and displays an object image other than the three or more object images in a region inside the polygon.

In an image-processing device according to one aspect of the present invention, it is possible that a plurality of points are determined in the object image, and the display control means changes the point determined in the object image depending on a position in the display area of the display means at which the object image is arranged.

In such a case, the display control means may arrange and display the object images at positions such that the polygon is formed by line segments defined by use of one of the determined plurality of points in the object image that is close to a center of the display area of the display means. Also, the display control means may arrange and display the object images at positions such that the polygon is formed by line segments defined by use of one of the determined plurality of points in the object image that results in a large displayed area of the object image.

Further, a program according to another aspect of the present invention causes a computer to execute the above-described process, that is, causes a computer to function as the aforementioned information-processing device. The program according to the other aspect of the present invention may be downloaded to a computer via a network such as the Internet, and installed in the computer for use. A storage medium according to yet another aspect of the present invention is a storage medium, such as an optical disk or the like, on which such a program is stored.

According to the present invention, it is possible, in a case where multiple images such as windows or the like are displayed, to improve the layout design of the images, and to ensure that the images are contained within a display area when a number of images displayed is large.

BRIEF DESCRIPTION OF THE DRAWINGS

FIG. 5 is a diagram showing a mode of arrangement of windows where a number of displayed windows N=2.

DETAILED DESCRIPTION

Figure 1:
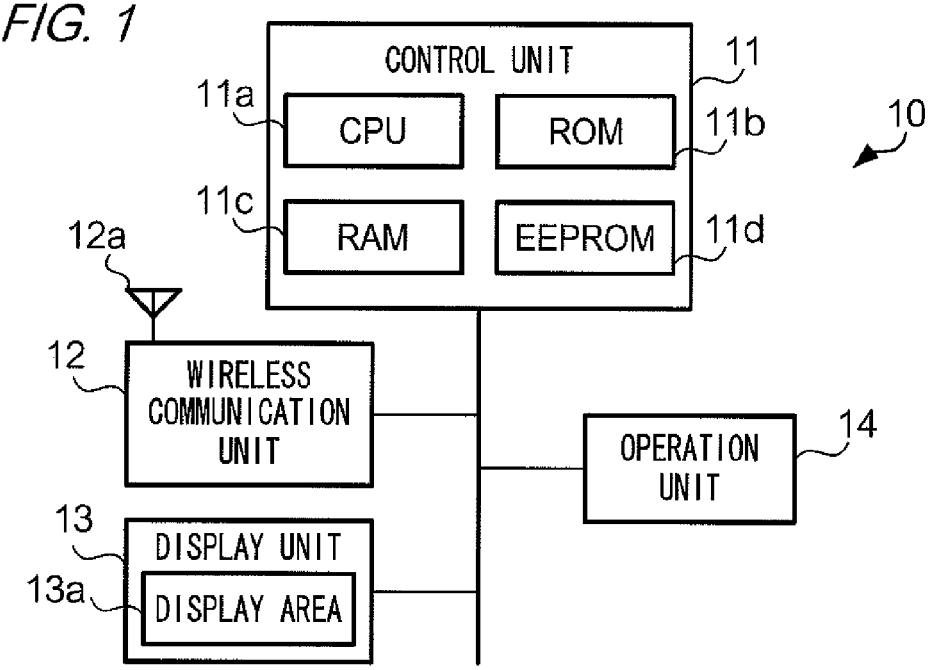
FIG. 1 is a block diagram showing a physical configuration of a communication terminal device.

FIG. 1 is a block diagram showing a physical configuration of a communication terminal device according to an embodiment of the present invention. As shown in this drawing, communication terminal device 10 includes control unit 11, wireless communication unit 12, display unit 13, and operation unit 14. It is to be noted that communication terminal device 10 according to the present embodiment is a mobile phone having a means for inputting and outputting a voice (not shown) such as a microphone and a speaker.

Control unit 11 includes CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, so that control unit 11 controls an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in display area 13a based on display data provided from control unit 11. Operation unit 14 includes plural keys (operation elements), and, upon receiving an instruction via a key-pressing operation by a user, provides operation information to control unit 11, which corresponds to the key-pressing operation. It is to be noted that the operation elements may be so-called hard buttons, and if communication terminal device 10 has a touch panel, the instruction may be received via the touch panel.

ROM 11b pre-stores some programs. Hereinafter, the programs will be referred to as "preinstalled programs." The preinstalled programs include a multitask operating system (hereinafter referred to as "multi-task OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 140 (described later) in communication terminal device 10 in which the multitask OS is installed. The native applications are programs for realizing a basic function of communication terminal device 10 such as a telephone call.

EEPROM 11d includes Java application storage areas for storing Java applications. A Java application includes a JAR (Java Archive) file that is a combination of a substance program that describes a procedure in a Java Runtime Environment, and image files, audio files, and so on that are used when the substance program is executed; and an ADF (Application Descriptor File) in which properties of installation, start-up, and so on of the JAR file are described. The Java application is prepared by a content provider or a telecommunications carrier, and stored in an external server device or the like. Java applications are downloaded from such server devices on request by communication terminal device 10.

Figure 2:
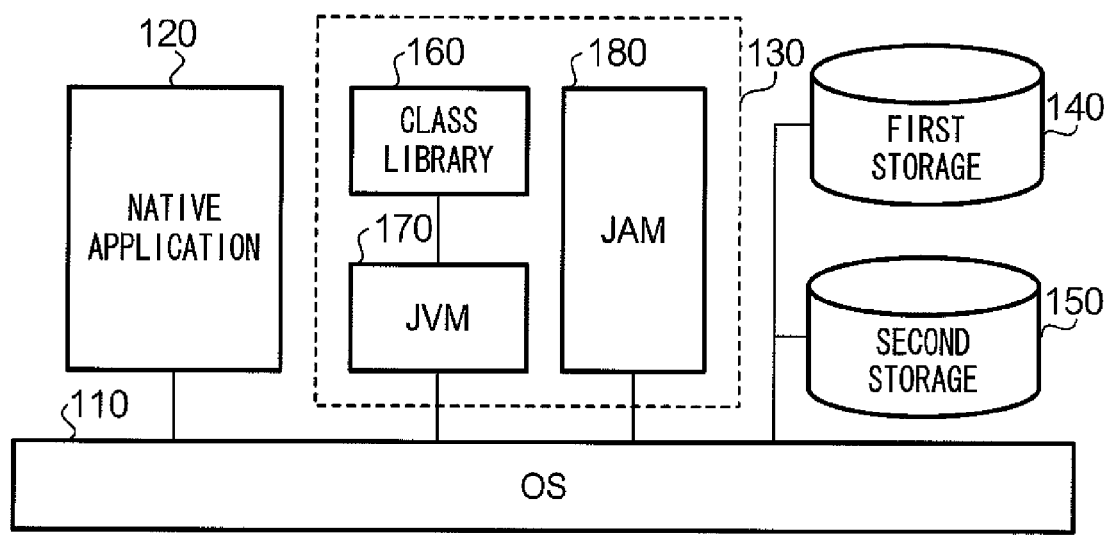
FIG. 2 is a diagram showing a logical configuration of a communication terminal device.

FIG. 2 is a diagram showing a logical configuration of respective units realized by control unit 11 of communication terminal device 10 by executing programs stored in ROM 11b and EEPROM 11d. As shown in this drawing, in communication terminal device 10 that executes the programs, native application 120 and Java Runtime Environment 130 are realized in OS 110, and first storage 140 and second storage 150 are secured in EEPROM 11d.

Java Runtime Environment 130 is realized by use of the Java platform stored in ROM 11b. Java Runtime environment 130 includes class library 160, JVM (Java Virtual Machine) 170, and JAM (Java Application Manager) 180. Class library 160 is a file of a combination of program modules (classes) that have a particular function. JVM 170 is a Java Runtime Environment that is optimized for the CDC described above, and has a function of interpreting and executing bytecodes provided as a Java application. JAM 180 has a function of managing downloading, installation, start-up, termination, and so on of Java applications.

First storage 140 is an area for storing Java applications (JAR files and ADFs), which are downloaded under control of JAM 180. Second storage 150 is an area in which an individual storage area is assigned to each installed Java application, and is used for storing data generated during running of Java applications after the applications are terminated. The data in a storage area assigned to a certain Java application can be rewritten only when the application is running; therefore, the data cannot be rewritten by another Java application.

Java applications of the present embodiment include applications for displaying plural windows. The Java applications for displaying plural windows include a "window display application" and a "widget." The window display application is an application for displaying one or more windows on display unit 13, and controlling the display of the one or more windows. The "widget" is an application that realizes a predetermined function on the condition that the window display application displays a window. A "window" of the present embodiment refers to an image displayed in a part of a display area of display unit 13 that is assigned to a widget, and is displayed as an image that can be distinguished from an image in another part of the display area. The window displays certain information, and is an example of an "object image" of the present invention. It is to be noted that the shape and size (area) of the window are determined depending on a widget; however, they may be changed.

In the present embodiment, communication terminal device 10 executes plural widgets each realizing a different function. The widgets include, for example, a widget for displaying a time and date by displaying a clock image in a window, a widget for displaying characters or the like input by a user in a window as a memorandum, a widget for playing a video or music, a widget for executing a computer game, and so on. Also, the widgets may include a widget that obtains information such as news or weather forecast via wireless communication unit 12 at appropriate timings, and displays images according to the obtained information.

A number of windows of widgets caused to be displayed on display unit 13 simultaneously by communication terminal device 10, the number being denoted by N and referred to as "display number" hereinafter, can vary in a range from the minimum number "1" to the maximum number Nm. In the following, an example in which Nm=8 will be explained. Maximum number Nm is predetermined in a design stage based on a relationship between a capacity of a work area in RAM 11b used by communication terminal device 10 to execute a widget(s) and a capacity necessary for execution of each widget, a size of display area 13a of display unit 13 relative to a size of a window, or the like.

The foregoing is a description of the configuration of communication terminal device 10. Communication terminal device 10 having such a configuration executes plural applications in accordance with a request by a user. Communication terminal device 10 according to the present embodiment realizes a so-called multi-window system by displaying windows of widgets. Namely, communication terminal device 10 runs a window display application when displaying plural windows. By operating a direction key of operation unit 14, a user is able to select one from among the plural windows or change the selected window. In response to a signal output from operation unit 14, control unit 11 selects at least one from among the plural windows displayed on display unit 13 or changes the selected window(s). It is to be noted that control unit 11 may select multiple windows instead of one. In the present embodiment, "selection" of a window means making the window the focus of an input operation or making the window active.

Communication terminal 10 causes a widget corresponding to a window selected by a user to execute a process different from that executed when the window is not selected. In other words, each widget can execute different processes depending on whether the corresponding window is selected. For example, a widget for displaying a clock executes a process of displaying a time and date when the corresponding window is not selected, and executes a process of changing the date and time or appearance (color, for example) when the corresponding window is selected. Also, a widget for displaying a memorandum executes a process of displaying characters or the like when the corresponding window is not selected, and executes a process of changing the characters or the like when the corresponding window is selected. Similarly, a widget for playing a video or music executes a process of playing a video or music when the corresponding window is not selected, and executes a process of adjusting a volume of sound, pausing, fast-forwarding, or the like when the corresponding window is selected. It is to be noted that these processes are executed in response to an operation performed by a user; for example, when a user performs an operation for adjusting a time, a process for adjusting a time is executed.

In some cases, the window display application may suspend displaying windows. For example, when a user starts a telephone call during execution of displaying of windows by the window display application, communication terminal device 10 executes an interrupt process of replacing an image displayed on display unit 13 with an image for a telephone call. To deal with such a case, control unit 11 of communication terminal device 10 generates, in response to execution of an interrupt process or at a timing independent of execution of an interrupt process, display information that indicates a mode of display of the windows, and stores the display information in EEPROM 11d. Every time there is a change in display of the windows, control unit 11 updates the display information. The display information includes information indicating the windows displayed at that time and an arrangement of the windows, and information indicating the window selected at that time. It is to be noted that the display information includes identification information for identifying each window. Thereafter, when the telephone call is terminated and a user performs a predetermined operation, communication terminal device 10 restarts displaying of windows by the window display application. Communication terminal device 10 refers to the display information and restarts displaying of windows such that the windows are displayed in the same manner as that before the suspension.

Figure 3:
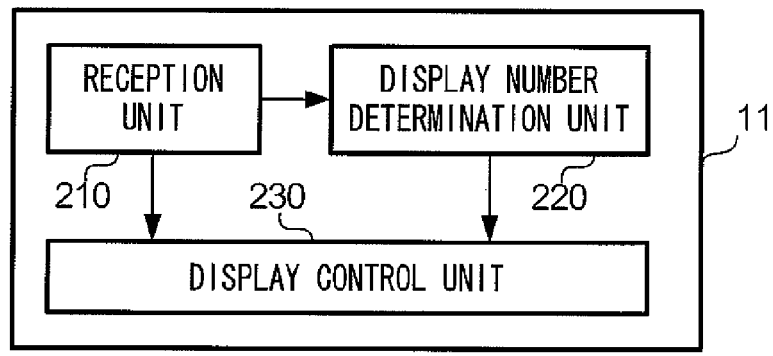
FIG. 3 is a diagram showing functions realized by a communication terminal device.

FIG. 3 is a functional block diagram showing functions realized by control unit 11 of communication terminal device 10 when plural windows are displayed. Control unit 11 of communication terminal device 10 executes the window display application to realize the functions corresponding to reception unit 210, display number determination unit 220, and display control unit 230, which are shown in FIG. 3.

Reception unit 210 acquires operation information from operation unit 14, thereby to receive an instruction of displaying a window on display unit 13. The operation information is provided when a user instructs execution of a widget via operation unit 14 or termination of execution of a widget. In other words, based on operation information, an instruction of increasing or decreasing the display number of the windows displayed on display unit 13 is provided.

Display number determination unit 220 determines, in response to the instruction of displaying a window received by reception unit 210, display number N of the windows to be displayed on display unit 13, and provides the determined display number N to display control unit 230. It is to be noted that display number N determined by display number determination unit 220 is determined based on an amount of increase or decrease in the display number of the windows according to an instruction received by reception unit 210 and a display number of the windows that have been displayed on display unit 13 prior to receipt of the instruction.

Display control unit 230 performs display control to cause display unit 13 to display one or more windows based on the instruction received by reception unit 210 and window display number N determined by display number determination unit 220. By this display control, display control unit 230 arranges and displays each window in accordance with display number N.

Next, a mode of arrangement of windows will be explained concretely for each of the cases from a case where display number N=1 to a case where N=Nm=8.

Figure 4:
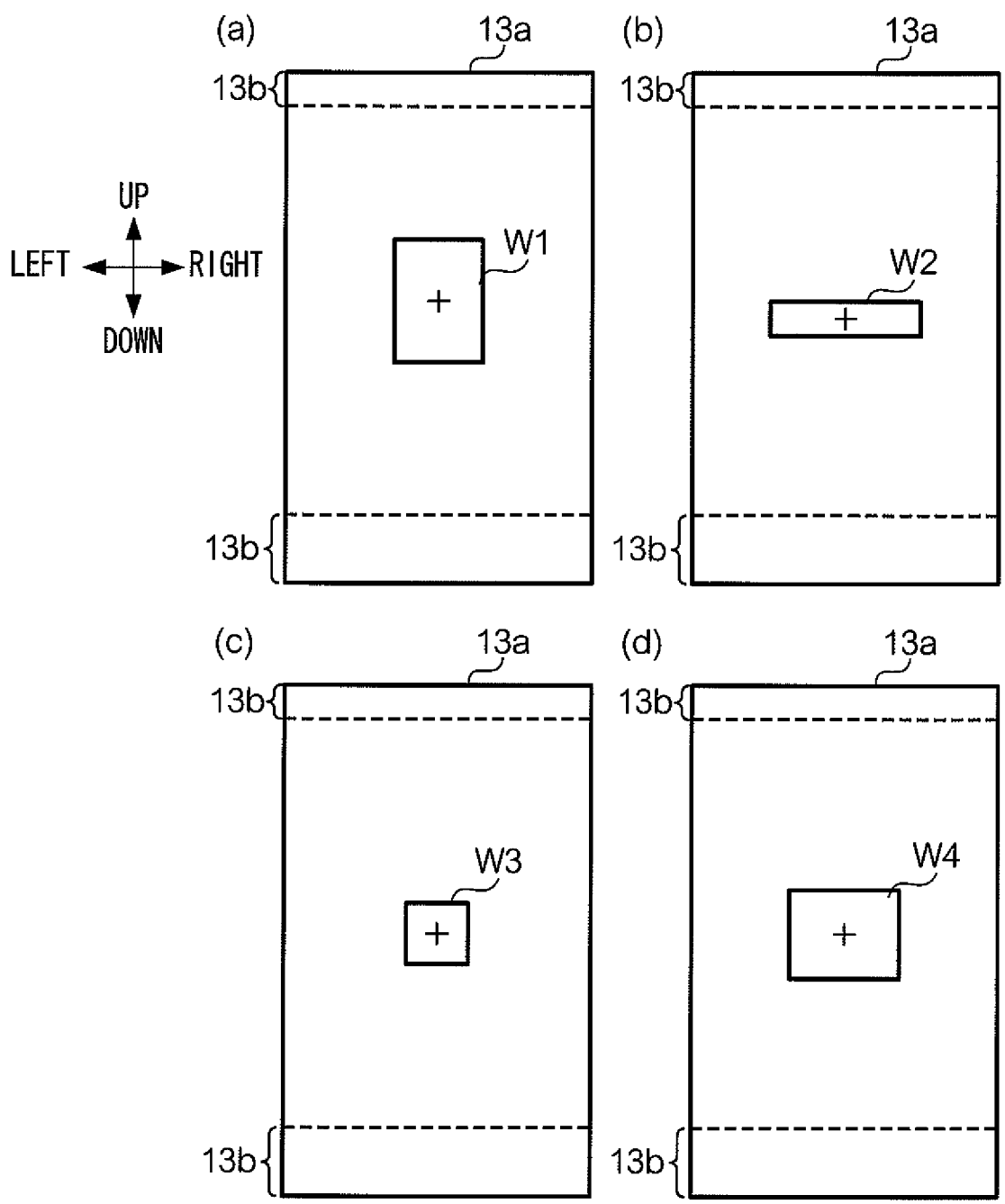
FIG. 4 is a diagram showing a mode of arrangement of windows where a number of displayed windows N=1.

First, a basic configuration of display area 13a of display unit 13 will be explained with reference to FIG. 4 showing a mode of arrangement of a window in a case where display number N=1.

A rectangular area having the largest size in each of FIGS. 4(a)-(d) schematically represents display area 13a of display unit 13. In areas 13b that contact an upper end and a lower end of display area 13a, an image resembling a battery for indicating a remaining amount of charge of a battery, an image for guiding an operation of operation keys of operation unit 14, and the like, are located. No window is displayed in areas 13b. That is, a window is displayed in a part of display area 13a other than areas 13b. In the following description, "display area 13a" of display unit 13 indicates "only an area in which a window can be displayed," which specifically is a part of display area 13a excluding areas 13b. It is to be noted that display area 13a may not include an area corresponding to area 13b, and in such a case, a window can be displayed in a whole part of display area 13a.

It is also to be noted that the upward, downward, leftward, and rightward directions of display area 13a of display unit 13 shown in FIG. 4 respectively correspond to the upward, downward, leftward, and rightward directions of a sheet, and in the following description, each direction of display area 13a will be represented by a corresponding direction of the sheet.

FIG. 4(a) shows a mode of arrangement when rectangular window W1 having a larger length in the vertical direction than in the horizontal direction is displayed (this window may be referred to as "vertically elongated window" hereinafter). FIG. 4(b) shows a mode of arrangement when window W2 having a considerably larger length in the horizontal direction than in the vertical direction is displayed (here, the horizontal length is five times the vertical length, and this window may be referred to as a "bar-type window" hereinafter, where a "bar-type window" indicates a window having a ratio of horizontal length to vertical length that exceeds a threshold value). FIG. 4(c) shows a mode of arrangement when square window W3 is displayed. FIG. 4(d) shows a mode of arrangement when rectangular window W4 having a somewhat larger length in the horizontal direction than in the vertical direction is displayed (here, the horizontal length is one and a half times the vertical length, and this window may be referred to as "horizontally elongated window" hereinafter). In this example, the windows displayed by communication terminal device 10 are classified into these four types. It is to be noted that in the following description, in a case where multiple windows of the same type are displayed on display unit 13, they are distinguished from one another by suffixing of a letter to a reference symbol.

In FIGS. 4(a)-(d), a center of each window is indicated by symbol "+." In a case where display number N=1, control unit 11 displays a window such that a center point of the window coincides with a center of display area 13a. When the window constitutes a point-symmetric image, the "center point" of the window is the center point of the image. Alternatively, the "center point" of the window may be represented as a center of gravity if the window is regarded as a plate-like object constituted of a uniform mass.

FIGS. 5(a)-(d) are diagrams showing a mode of arrangement of windows where display number N=2. In these drawings, combinations of types of windows displayed in display area 13a are different. However, in each combination, the windows are located at two positions in the vertical direction, and the position of the center point of each window in display area 13a is determined Namely, in FIGS. 5(a)-(d), the positions of the center points of windows W1a, W4, W2, and W1, which are located in an upper part of display area 13a, are the same, and the positions of the center points of windows W1b, W2, W3, and W4, which are located in a lower part of display area 13a, are the same. Further, a line connecting the center point of the upper window and the center point of the lower window extends in the vertical direction of display area 13a, that is, the horizontal positions of the center points of these windows are the same. It is to be noted that a distance between the windows (in this example, a distance between the center points of the windows) is fixed, irrespective of the types (sizes, shapes, or the like) of the displayed windows, and an amount of the distance is predetermined at a design stage such that the windows do not overlap each other and each window is contained within display area 13a.

FIGS. 6(a)-(d) are diagrams showing a mode of arrangement of windows where display number N=3. In a case where display number N=3 also, the position of the center point of each window in display area 13a is predetermined Specifically, in FIG. 6(a), windows W1a and W1b are arranged side-by-side in the horizontal direction and window W1c is positioned above windows W1a and W1b, such that, when the center point of window W1c is connected by line segments to respective ends of a line segment connecting the center points of windows W1a and W1b, a figure formed by these line segments represents triangle D3 whose base is the line segment connecting the center points of windows W1a and W1b. As shown in FIGS. 6(b)-(d), for different combinations of window types, the windows are arranged to form a triangle congruent with triangle D3 shown in FIG. 6(a). In this case also, a distance between center points of windows, which corresponds to a length of a respective side of triangle D3, is fixed irrespective of the types of displayed windows, the distance being predetermined such that the windows do not overlap one another and each window is contained within display area 13a.

FIGS. 7(a)-(d) are diagrams showing a mode of arrangement of windows where display number N=4. In a case where display number N=4 also, the position of the center point of each window in display area 13a is predetermined. Specifically, in FIG. 7(a), windows W1a and W1b are arranged side-by-side in the horizontal direction at a position above the center of display area 13a, and windows W1c and W1d are arranged side-by-side in the horizontal direction at a position below the center of display area 13a. The distance between the center points of given adjacent windows is made equal, so that when the center points of adjacent windows are connected by line segments, a figure formed by the line segments represents square D4, which is an example of a quadrangle. Further, as shown in FIGS. 7(b)-(d), for different combinations of window types, the windows are arranged to form a square congruent with square D4 shown in FIG. 7(a). In this case also, a distance of fixed value between the center points (a length of a respective side of square D4) is predetermined such that the windows do not overlap one another and each window is contained within display area 13a.

FIGS. 8(a)-(d) are diagrams showing a mode of arrangement of windows where display number N=5. In a case where display number N=5 also, the position of the center point of each window in display area 13a is predetermined Specifically, in FIG. 8(a), windows W1a and W1b are arranged side-by-side in the horizontal direction at a position above the center of display area 13a and windows W1c and W1d are arranged side-by-side in the horizontal direction at a position below the center of display area 13a. Further, window W1e is arranged above windows W1a and W1b. This window W1e is horizontally positioned substantially at a center of display area 13a. Namely, in the case where display number N=5, the windows are arranged at positions such that, when the center points of adjacent windows are connected by line segments, a figure formed by these line segments represents pentagon D5. As shown in FIG. 8(b)-(d), for different combinations of window types, the windows are arranged to form a pentagon congruent with pentagon D5 shown in FIG. 8(a). In this case also, a distance of fixed value between the center points (a length of a respective side of pentagon D5) is predetermined such that the windows do not overlap one another and each window is contained within display area 13a. It is to be noted that in this example, pentagon D5 is not a regular pentagon, and thus, not all sides have the same length.

Figure 6:
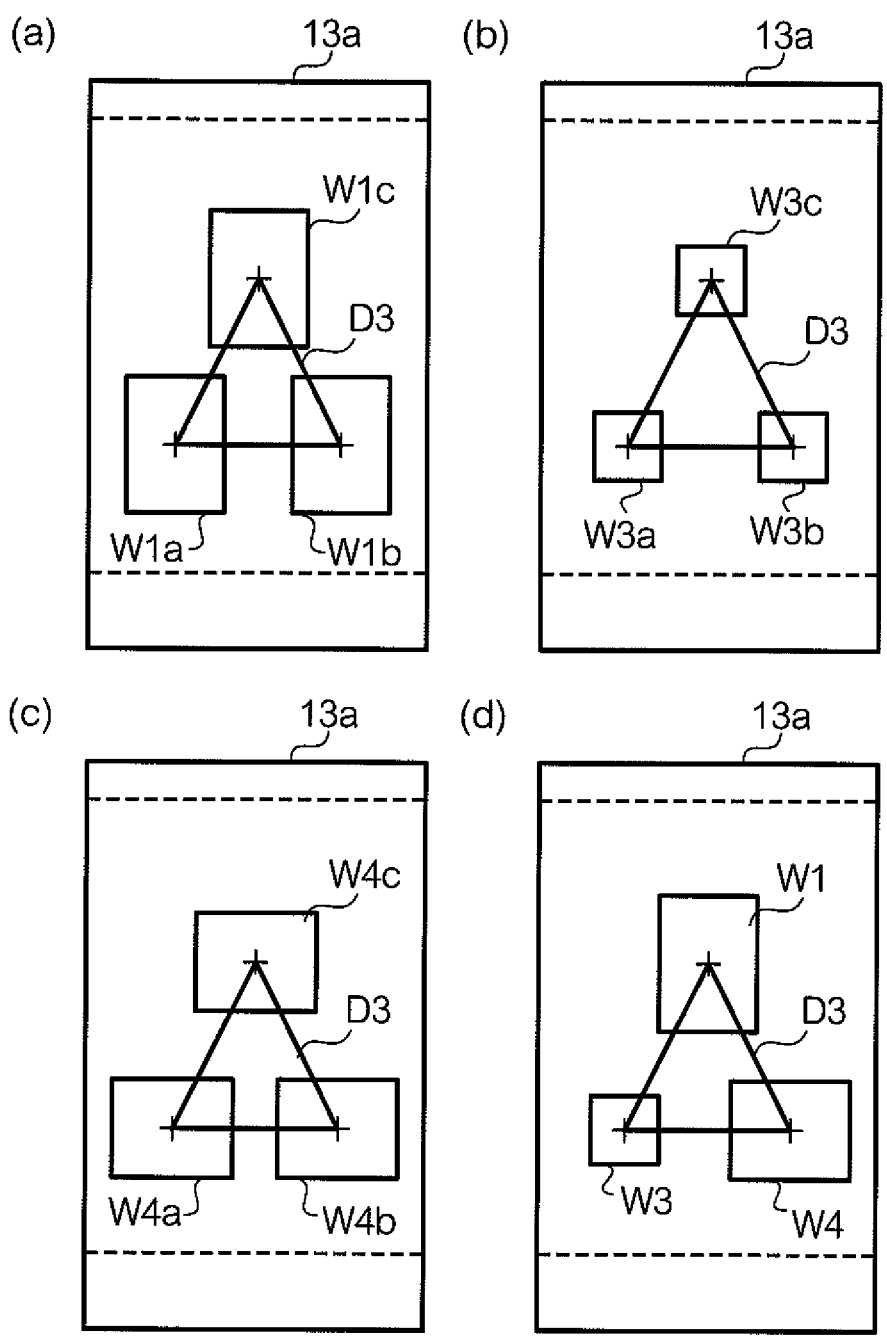
FIG. 6 is a diagram showing a mode of arrangement of windows where a number of displayed windows N=3.
Figure 7:
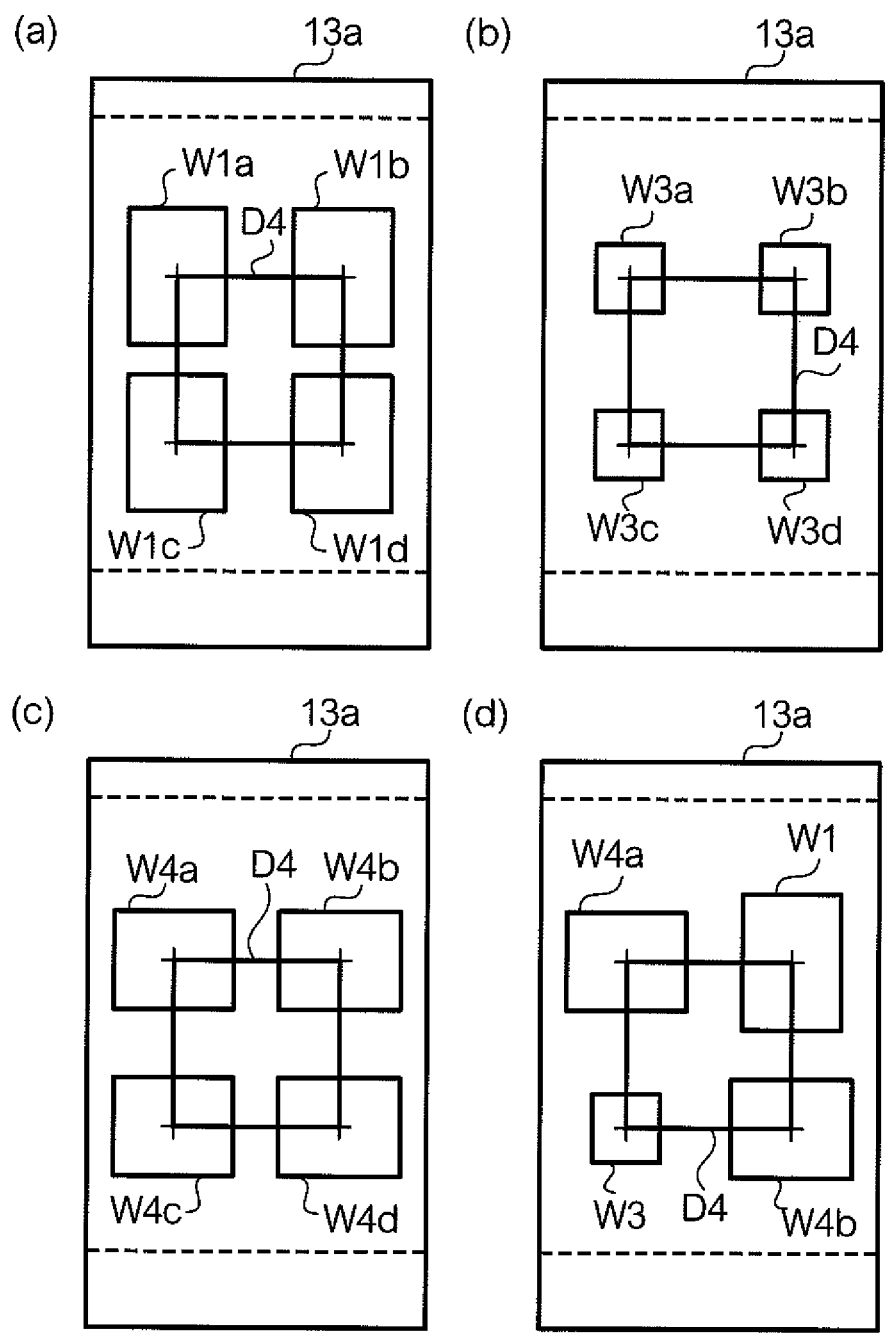
FIG. 7 is a diagram showing a mode of arrangement of windows where a number of displayed windows N=4.
Figure 8:
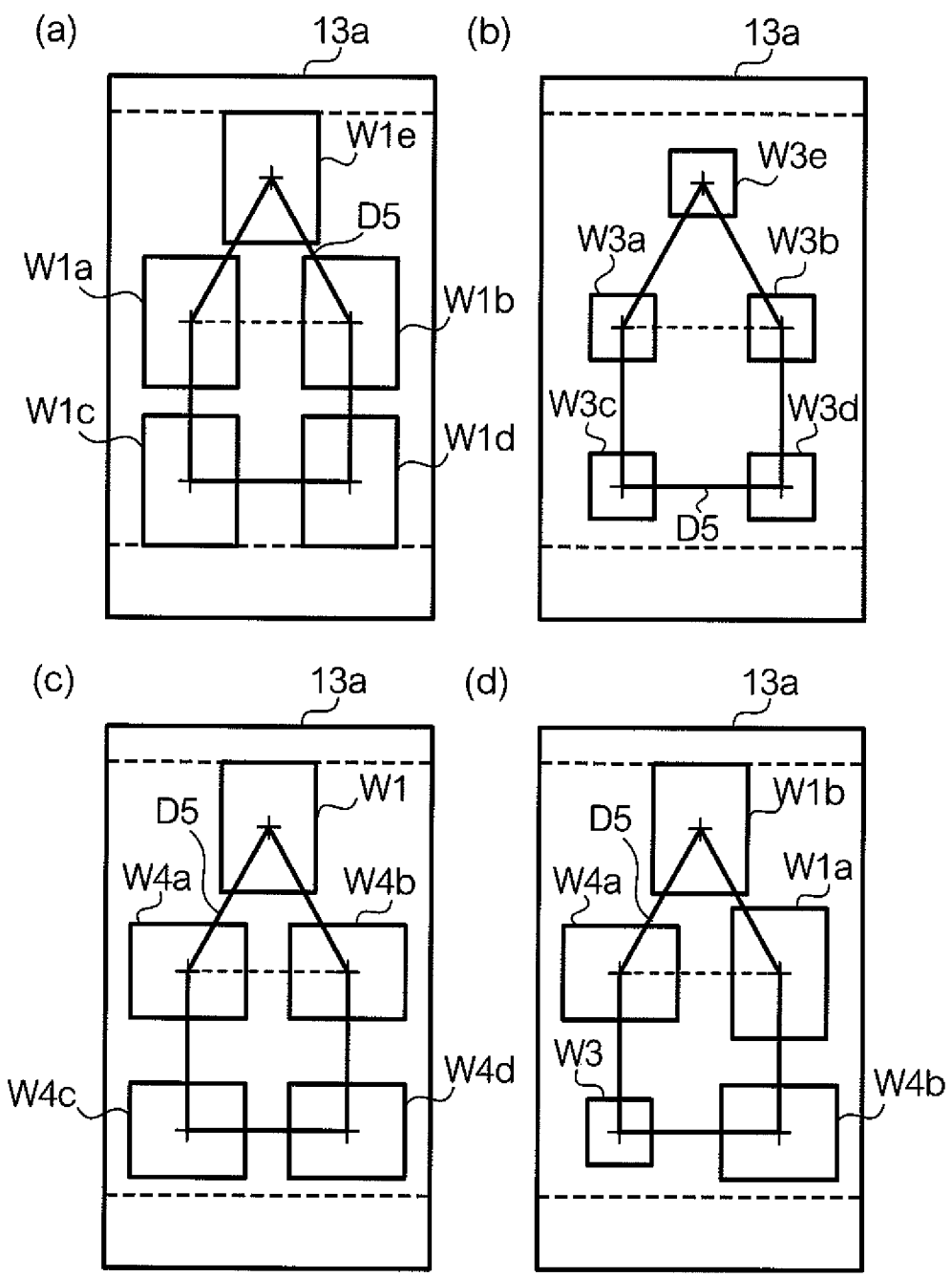
FIG. 8 is a diagram showing a mode of arrangement of windows where a number of displayed windows N=5.

As is described in the foregoing with reference to FIGS. 6-8, in a case where display number N=3, 4, or 5, control unit 11 arranges and displays the windows at positions such that, when center points of adjacent windows are connected by line segments, a figure formed by these line segments represents a polygon having a number of vertices corresponding to display number N determined by display number determination unit 220. Owing to adoption of such a mode of arrangement, a UI having better design can be provided, as compared to a case where the windows are arranged simply in one or more rows, for example, and this can be highly appealing to consumers. Also, when display number N=3, 4, or 5, as the number of the windows displayed on display unit 13 increases/decreases, the shape of the polygon changes in response to display number N, providing a user with a dynamically-changing UI, which is effective in increasing visual interest.

Figure 9:
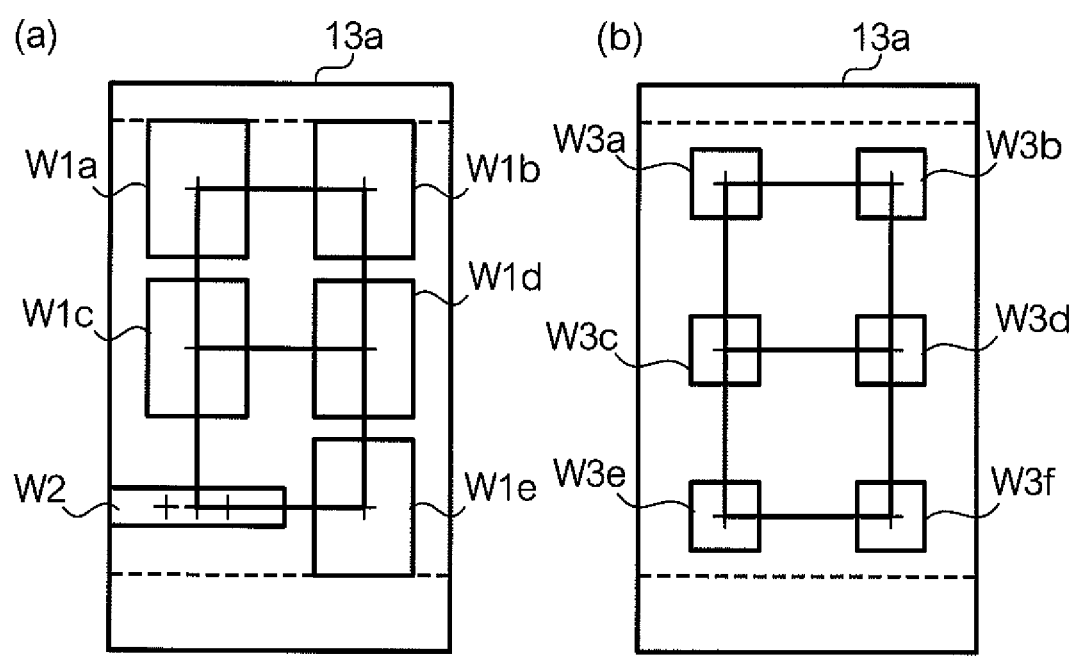
FIG. 9 is a diagram showing a mode of arrangement of windows where a number of displayed windows N=6.

FIGS. 9(*a*) and (*b*) are diagrams showing a mode of arrangement of windows where display number N=6. In a case where display number N=6 also, the position of the center point of each window in display area 13*a* is predetermined. However, a mode of arrangement of windows where display number N=6 is very different from that in cases where display number N 5 (specifically, N=3, 4, or 5). Specifically, as shown in FIGS. 9(*a*) and (*b*), the windows are arranged in multiple rows extending vertically in display area 13*a*. In other words, the windows are arranged such that, when centers of adjacent windows are connected by line segments, a figure formed by these line segments represents a grid. The reason such a mode of arrangement is adopted is that when display number N of windows is larger than a certain number, it is difficult to arrange all windows within display area 13*a*. If, in the case where N=6, the windows were arranged such that a figure formed by line segments each connecting the center points of adjacent windows represents a hexagon in a manner similar to that where N=3, 4, or 5, there would be a possibility that a window may be arranged near an end portion of display area 13*a* so that a part of the window goes beyond the boundary of display area 13*a*. That is, there would be a possibility that an entire part of each window may not be displayed. In contrast, in the mode of arrangement in which the windows are arranged in rows as shown in FIGS. 9(*a*) and (*b*), it is possible to increase the possibility that an entire part of each window can be displayed even when the number of the windows displayed is large.

Figure 10:
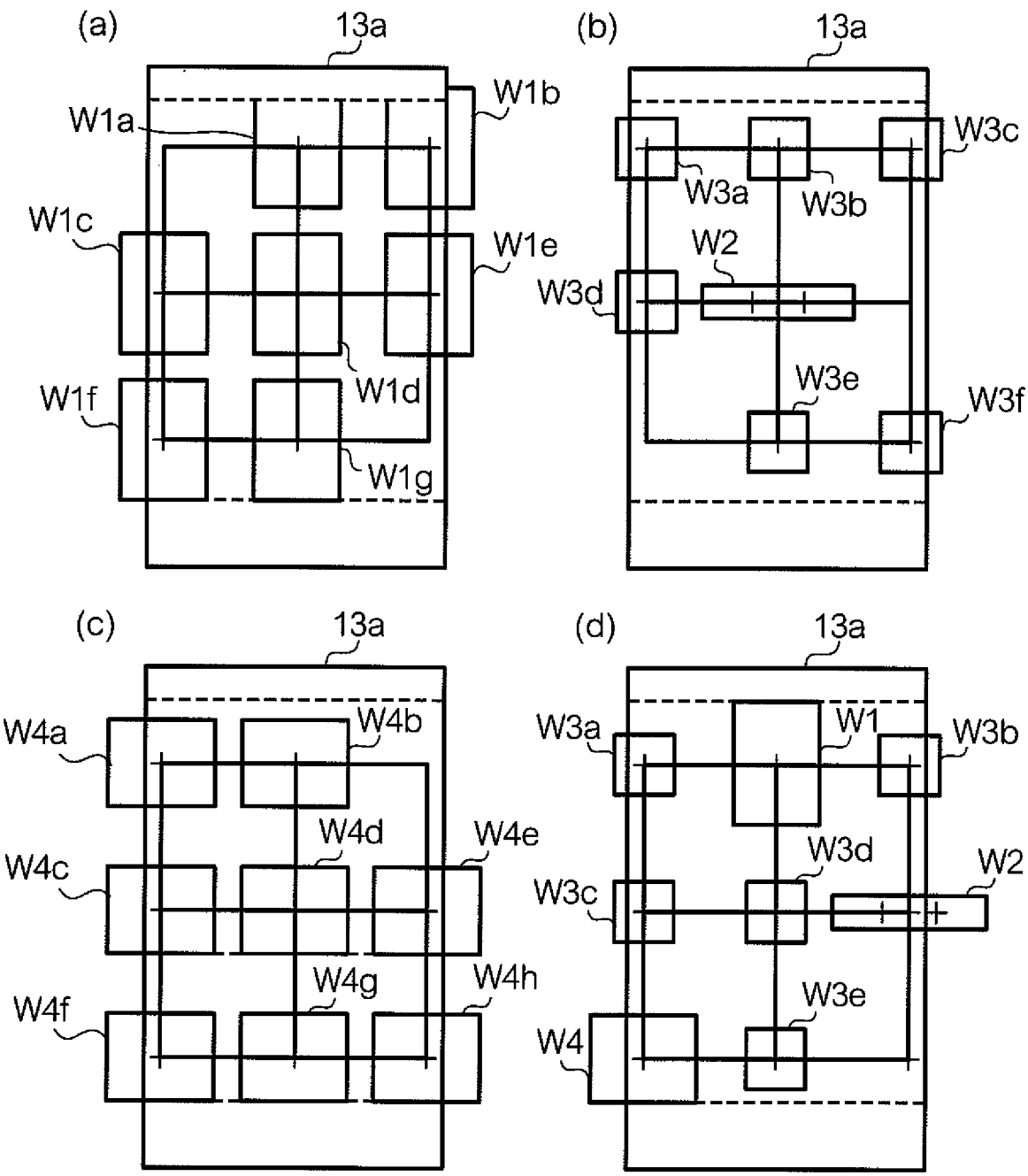
FIG. 10 is a diagram showing a mode of arrangement of windows where a number of displayed windows N=7 and 8.

FIGS. 10(*a*)-(*d*) are diagrams showing modes of arrangement of windows where display number N=7 or 8. FIGS. 10(*a*) and (*b*) show a mode of arrangement of windows where display number N=7. FIGS. 10(*c*) and (*d*) show a mode of arrangement of windows where display number N=8 (i.e., N=Nm). As shown in FIGS. 10(*a*)-(*d*), in a case where N=7 or 8 also, the windows are arranged in rows extending vertically in display area 13*a*. In other words, the windows are arranged such that, when centers of adjacent windows are connected by line segments, a figure formed by these line segments represents a grid. In this case, as shown in FIGS. 10(*a*)-(*d*), there are windows arranged near an end portion of display area 13*a* and partially protruding outside display area 13*a*. The parts protruding outside display area 13*a* are not displayed on display unit 13, and thus a user cannot view these parts. However, most of each window is contained within display area 13*a*, and thus, a user who views a window can recognize clearly the content displayed in the window. Therefore, the parts protruding outside display area 13*a* will not substantially affect the use of communication terminal device by the user.

2. Operation

Figure 11:
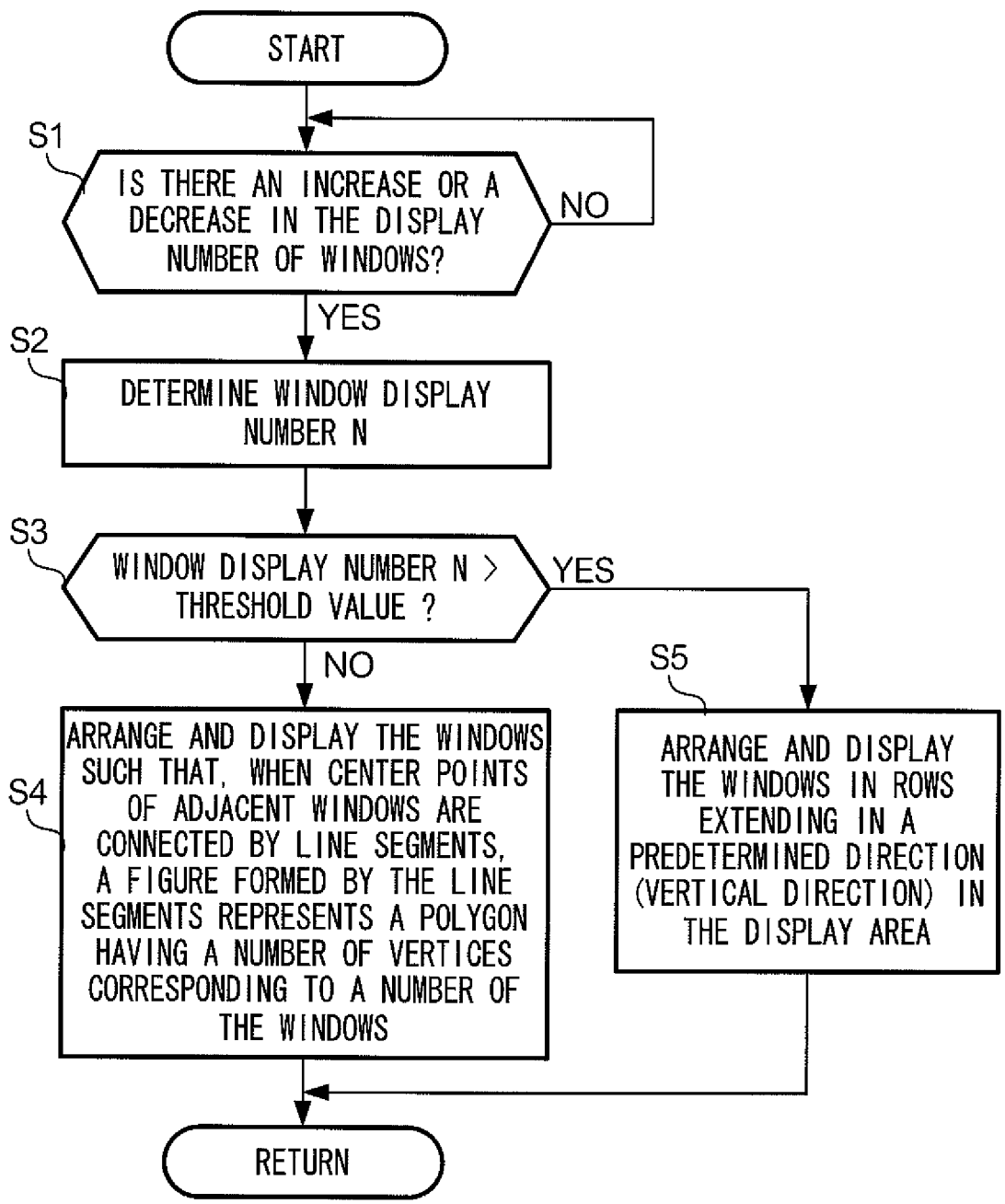
FIG. 11 is a flowchart showing display control performed by a control unit of a communication terminal device.

FIG. 11 is a flowchart showing display control achieved by execution of a window display application by control unit 11 to display windows of widgets. In step S1, control unit 11 decides whether an instruction leading to an increase or a decrease in display number N of windows is received. The instruction leading to an increase in display number N is an instruction of execution of a new widget, for example. The instruction leading to a decrease in display number N is an instruction of termination of a widget being executed, for example. These instructions are input by a user via operation unit 14. If it is decided that there is no instruction leading to any increase or decrease in display number N of windows (step S1; NO), control unit 11 waits for reception of an instruction leading to an increase or a decrease in display number N of windows. If it is decided that there is an instruction leading to an increase or a decrease in display number N of windows (step S1; YES), control unit causes the process to proceed to step S2.

Subsequently, control unit 11 determines display number N of windows to be displayed on display unit 13 in response to an instruction by a user of execution of a widget or termination of a widget being executed (step S2). In this step, display number N is determined based on a number of the windows displayed prior to increasing/decreasing of the windows and an amount of increase or decrease in the number of the windows resulting from the execution of a widget or the termination of a widget being executed, which has been instructed by the user. Then, control unit 11 decides whether the determined display number N of windows exceeds a threshold value (step S3). This threshold value is provided for determining which of the aforementioned modes of arrangement should be adopted in arranging of the windows. In this description, explanation will be given of an example in which the threshold value is "5." The threshold value is set by a program and stored in RAM 11*c*.

When it is decided that display number N of windows is equal to or smaller than the threshold value (step S3; NO), control unit 11 performs a process of arranging the windows in a mode explained with reference to FIGS. 4-8. That is, control unit 11 arranges and displays the windows such that, when center points of adjacent windows are connected by line segments, a figure formed by these line segments represents a polygon having a number of vertices corresponding to a number of the windows (step S4).

On the other hand, in a case where it is decided that the number of the windows exceeds the threshold value (step S3; YES), control unit 11 arranges and displays the windows in rows extending in a predetermined direction (vertical direction in this example) in display area 13*a* of display unit 13, as is described with reference to FIGS. 9 and 10 (step S5).

After performing display control of windows in step S4 or S5, control unit 11 waits for a novel instruction leading to an increase or a decrease in the number of the windows. Control unit 11 repeats steps S1-S5 until the execution of the window display application is terminated. It is to be noted that with respect to a window whose display position in display area 13*a* changes in response to an increase or a decrease in display number N, control unit 11 may perform display control to cause the window to move gradually from a position before the position change to a position after the position change, that is, to show movement of the window from a position before the position change to a position after the position change in a visually-recognizable manner; thus improving the design of the UI and increasing visual interest.

As is described in the foregoing, in a case where display number N of windows is equal to or smaller than a threshold value, communication terminal device 10 displays the windows in a mode of arrangement that can achieve improved design and emphasize appeal to consumers. In a case where the number of the windows exceeds the threshold value, communication terminal device 10 displays the windows in a mode of arrangement adapted for displaying the windows within display area 13*a*. In this way, when multiple windows are displayed, communication terminal device 10 can achieve improved design of the display, and when a number of the windows to be displayed is large, communication terminal device 10 can cause the windows to be displayed in an arrangement whereby the windows are contained within the display area.

In other words, communication terminal device 10 arranges windows in a first arrangement algorithm when display number N is equal to or smaller than a threshold value, and arranges the windows in a second arrangement algorithm that is different from the first arrangement algorithm when display number N exceeds the threshold value. Thus, communication terminal device 10 carries out arrangement of windows following a simple algorithm of preparing in advance modes of arrangement of windows as patterns, and determining a pattern based on the number of windows to be displayed. Therefore, an amount of processing executed by communication terminal device 10 relating to arrangement of windows can be small, and display control performed when there is an increase or a decrease in the display number of the windows can be simplified.

3. Modifications

The present invention may be carried out in an embodiment other than the above embodiment. For example, the present invention may be carried out in the embodiments described below. It is to be noted that two or more of the following modifications may be used in combination and that the present invention is not limited to these embodiments.

3-1. Modification 1

A mode of arrangement of windows is not limited to those of the above embodiment. A mode of arrangement of windows described below may be adopted. For example, in a mode of arrangement of windows shown in FIG. 9(*a*), bar-type window W2 has a relatively large horizontal length, and for this reason, there is a very small space between window W2 and its adjacent window W1*e*. If a horizontally elongated window or another bar-type window were placed at the position where window W1*e* is located, an inconvenient consequence may be that the two windows overlap one another, and a part of one of the windows is not displayed. Thus, in a case where a bar-type window is displayed, control unit 11 may arrange windows in a mode of arrangement described below. In the following description, explanation will be given of a mode of arrangement where it is determined that display number N is equal to or greater than 3. In a case where display number N=1 or 2, an arrangement in which windows do not overlap one another is possible, and thus, the same mode of arrangement as that of the exemplary embodiment is adopted.

Figure 12:
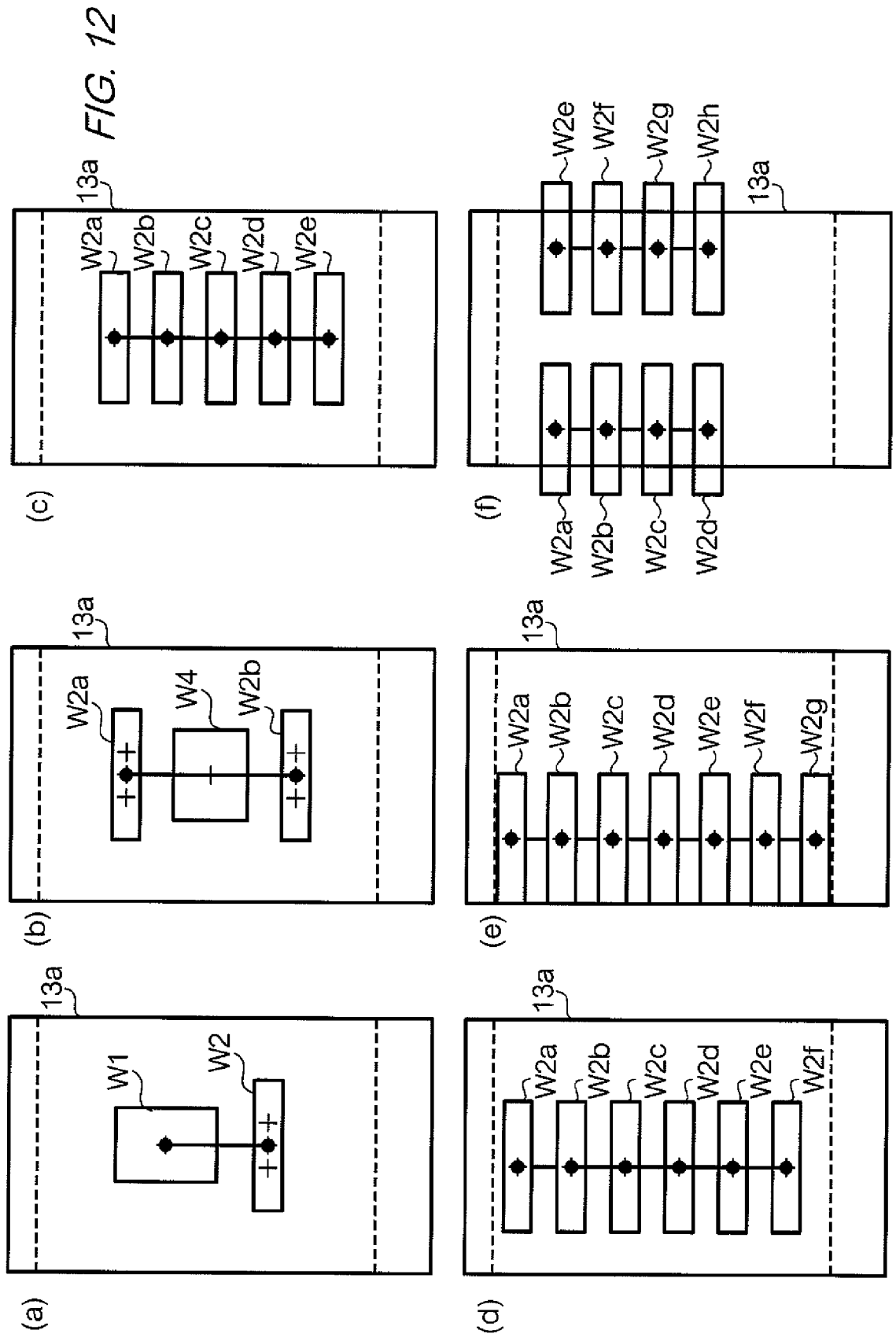
FIG. 12 is a diagram showing a mode of arrangement of windows according to Modification 1.

FIGS. 12(*a*)-(*f*) are diagrams showing a mode of arrangement of windows according to Modification 1. FIG. 12(*a*) shows a mode of arrangement in a case where one bar-type window and another window are displayed; FIG. 12(*b*) shows a mode of arrangement in a case where two bar-type windows and another window are displayed. Further, FIG. 12(*c*) shows a mode of arrangement in a case where five bar-type windows are displayed. FIG. 12(*d*) shows a mode of arrangement in a case where six bar-type windows are displayed. FIG. 12(*e*) shows a mode of arrangement in a case where seven bar-type windows are displayed. FIG. 12(*f*) shows a mode of arrangement in a case where eight bar-type windows are displayed.

FIGS. 12(*a*) and (*b*) show a mode of arrangement where display number N is equal to or smaller than a threshold value ("5" in this example). When the number of the bar-type windows displayed is equal to or greater than a certain number (another threshold value) (here, explanation will be given of an example in which the certain number is "2"), control unit 11 does not arrange the windows at such positions that the windows form a polygon. Control unit 11 arranges and displays the windows in a row along the vertical direction in display area 13*a*. If a mode of arrangement that would lead to an arrangement of windows forming a polygon as described with respect to the exemplary embodiment were adopted, there would be a possibility that a window(s) may be arranged near an end portion of display area 13*a* and a bar-type window may be partially outside display area 13*a*. When the mode of arrangement shown in FIGS. 12(*a*) and (*b*) is adopted, the windows can be arranged within display area 13*a* easily and the possibility that each window in its entirety is contained within display area 13*a* is increased. It is to be noted that though each window is positioned at a horizontal center of display area 13*a* in this example, the windows may be somewhat shifted in the horizontal direction.

FIGS. 12(*c*)-(*f*) show a mode of arrangement where display number N exceeds the threshold value ("5" in this example). When the display number of the bar-type windows is equal to or greater than the aforementioned certain number (i.e., "2"), control unit 11 arranges and displays the bar-type windows in a row(s) along the vertical direction of display area 13*a*. Specifically, control unit 11 arranges the bar-type windows along a direction perpendicular to the longitudinal direction (horizontal direction) of the bar-type window. In other words, control unit 11 performs the arrangement such that, when center points of adjacent bar-type windows are connected by line segments, these line segments are positioned in a line along a direction perpendicular to the longitudinal direction. It is to be noted here that as shown in FIG. 12(*f*), when display number N=8, control unit 11 arranges and displays the bar-type windows in two rows extending vertically. If display area 13*a* has a larger vertical size, all of the windows may be arranged in a single row.

Figure 13:
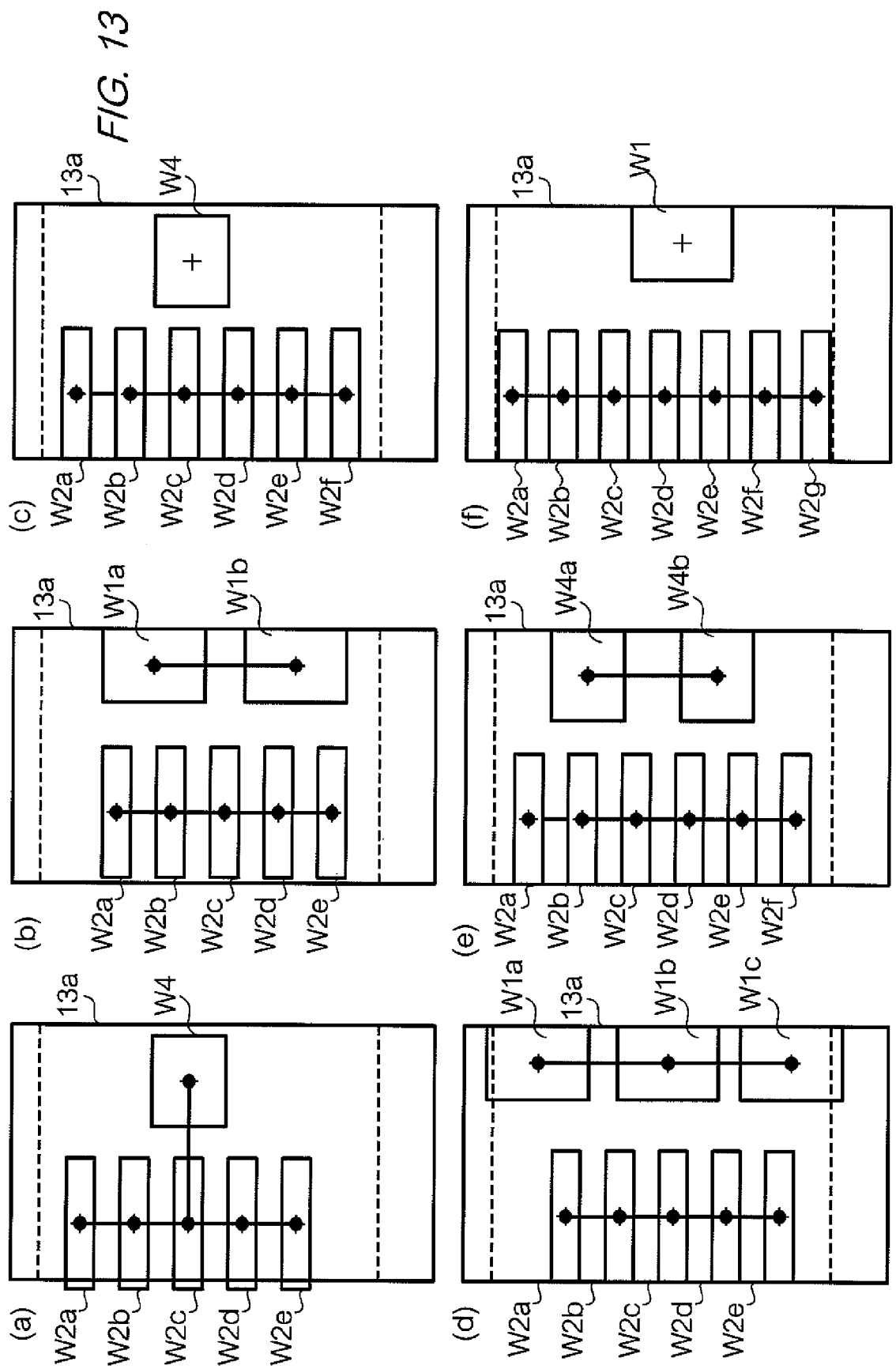
FIG. 13 is a diagram showing a mode of arrangement of windows according to Modification 1.

FIGS. 13(*a*)-(*f*) each show an example in which, in addition to bar-type windows, a window(s) of another type is displayed. FIG. 13(*a*) shows a mode of arrangement in a case where five bar-type windows and one horizontally elongated window are displayed. FIG. 13(*b*) shows a mode of arrangement in a case where five bar-type windows and two vertically elongated windows are displayed. FIG. 13(*c*) shows a mode of arrangement in a case where six bar-type windows and one horizontally elongated window are displayed. FIG. 13(*d*) shows a mode of arrangement in a case where five bar-type windows and three vertically elongated windows are displayed. FIG. 13(*e*) shows a mode of arrangement in a case where six bar-type windows and two horizontally elongated windows are displayed. FIG. 13(*f*) shows a mode of arrangement in a case where seven bar-type windows and one vertically elongated window are displayed. When bar-type windows of a number equal to or greater than the certain number ("2") are displayed on display unit 13, control unit 11 arranges the bar-type windows along the vertical direction of display area 13*a* or a direction perpendicular to the longitudinal direction of the bar-type window. Further, control unit 11 arranges the windows other than the bar-type windows along the vertical direction of display area 13*a* such that the windows other than the bar-type windows form a row separate from the row of the bar-type windows.

In the mode of arrangement of Modification 1, even when a number of the bar-type windows is large, the windows can be displayed in such an arrangement that there is a high possibility that the windows are contained within display area 13*a*. With regard to a window(s) of a type other than the bar-type window, even when a window(s) of a type other than those illustrated in FIGS. 12 and 13 are arranged, the same advantageous effects can be obtained by adopting the same mode of arrangement as that described above.

It is to be noted that a window for which the mode of arrangement of Modification 1 can be adopted may be any window having a direction of elongation, and is not limited to a bar-type window but may be a horizontally elongated window. Also, such a window may be a vertically elongated window, and in this case, it is preferred that vertically elongated windows are arranged in the horizontal direction. That is, in this case, the horizontal direction of display area 13a is a direction perpendicular to the direction of elongation of the vertically elongated window. Also, the arrangement does not have to be made exactly in the direction (vertical direction or horizontal direction) perpendicular to the direction of elongation of the window of each type. For example, the arrangement may be made along a direction from an upper left portion toward a lower right portion of display area 13a. In essence, when windows having a direction of elongation are displayed and a number of the windows is equal to or larger than a certain number, control unit 11 arranges the windows in a row(s) along a predetermined direction. It is to be noted that a window "having a direction of elongation" is a window whose aspect ratio is larger than predetermined threshold value r1. Further, a window whose aspect ratio is larger than a predetermined threshold value r2 (r2>r1) is referred to as a "bar-type window." These threshold values are set by a program.

3-2. Modification 2

The point used as a reference in determining a position of a window is not limited to a center point (center of gravity) of the window. In the above embodiment, communication terminal device 10 determines a position at which each window is arranged based on a center point of the window. It is possible, with respect to each window, to predetermine multiple points as points that can be used as a reference in arrangement, and to use a different point to determine an arrangement position depending on a display position of each window.

Figure 14:
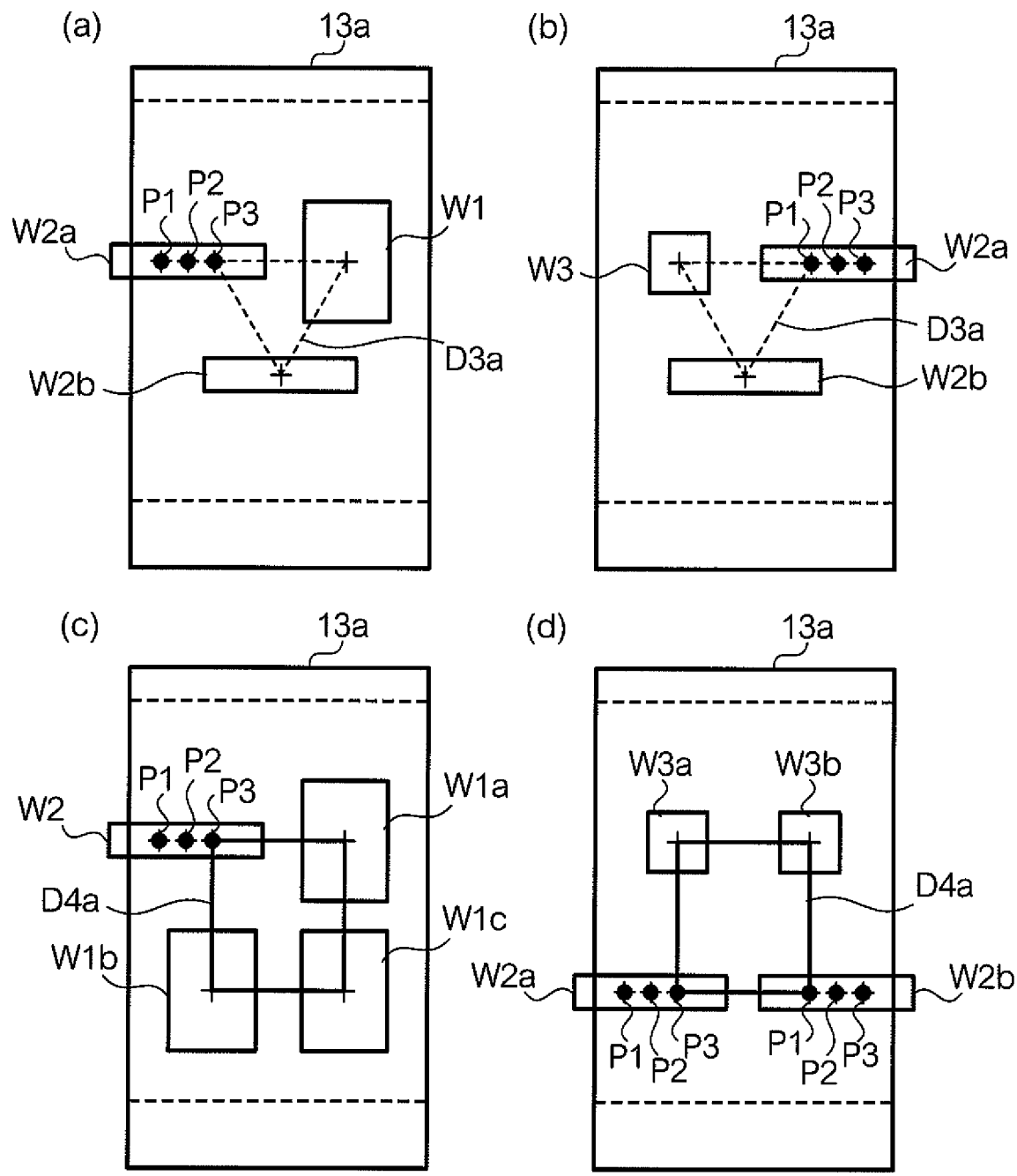
FIG. 14 is a diagram showing a mode of arrangement of windows according to Modification 2.

FIGS. 14(a)-(d) show an example of a mode of arrangement in a case where there are multiple points determined for a bar-type window. In this example, three points P1-P3 are predetermined as reference points for determination of position of the window. As shown in FIG. 14(a), when bar-type window W2a is positioned at the left side of display area 13a, point P3, which is the rightmost one of three points P1, P2 (center point), and P3, is selected. Window W2a is positioned such that point P3 coincides with a vertex of a polygon (triangle D3a in this example) that corresponds to display number N of the windows. In this way, the possibility that bar-type window W2a may overlap another window can be lowered as compared to a case where another point P1 or P2 is selected. Further, as shown in FIG. 14(b), when the bar-type window is positioned at the right side of display area 13a, the window is positioned such that point P1, which is the leftmost one of the three points, coincides with a vertex of the polygon. In this way, the possibility that bar-type window W2a may overlap another window can be lowered as compared to a case where another point P2 or P3 is selected. When the bar-type window is positioned near the center of display area 13a in the horizontal direction in the example shown in FIGS. 14(a) and 14(b), communication terminal device 10 selects center point P2. In such an example, it is possible to display the window closer to the center, as compared to a case where a point near the center is selected.

FIGS. 14(c) and (d) illustrate a mode of arrangement in a case where display number N=4. For the same reasons as for the case where display number N=3, communication terminal device 10 selects one of multiple points P1, P2, and P3 depending on an arrangement position of a window, and determines an arrangement position of the window accordingly. It is to be noted that which of the multiple reference points is selected depends on a policy applied to the window display. For example, in a case of a policy that a higher priority is put on avoiding overlap with another window, a point closest to the center (center of gravity) of display area 13a is selected. Alternatively, in a case of a policy that puts a higher priority on avoiding a window protruding outside display area 13a, a point most distant from the center (center of gravity) of display area 13a is selected.

Figure 15:
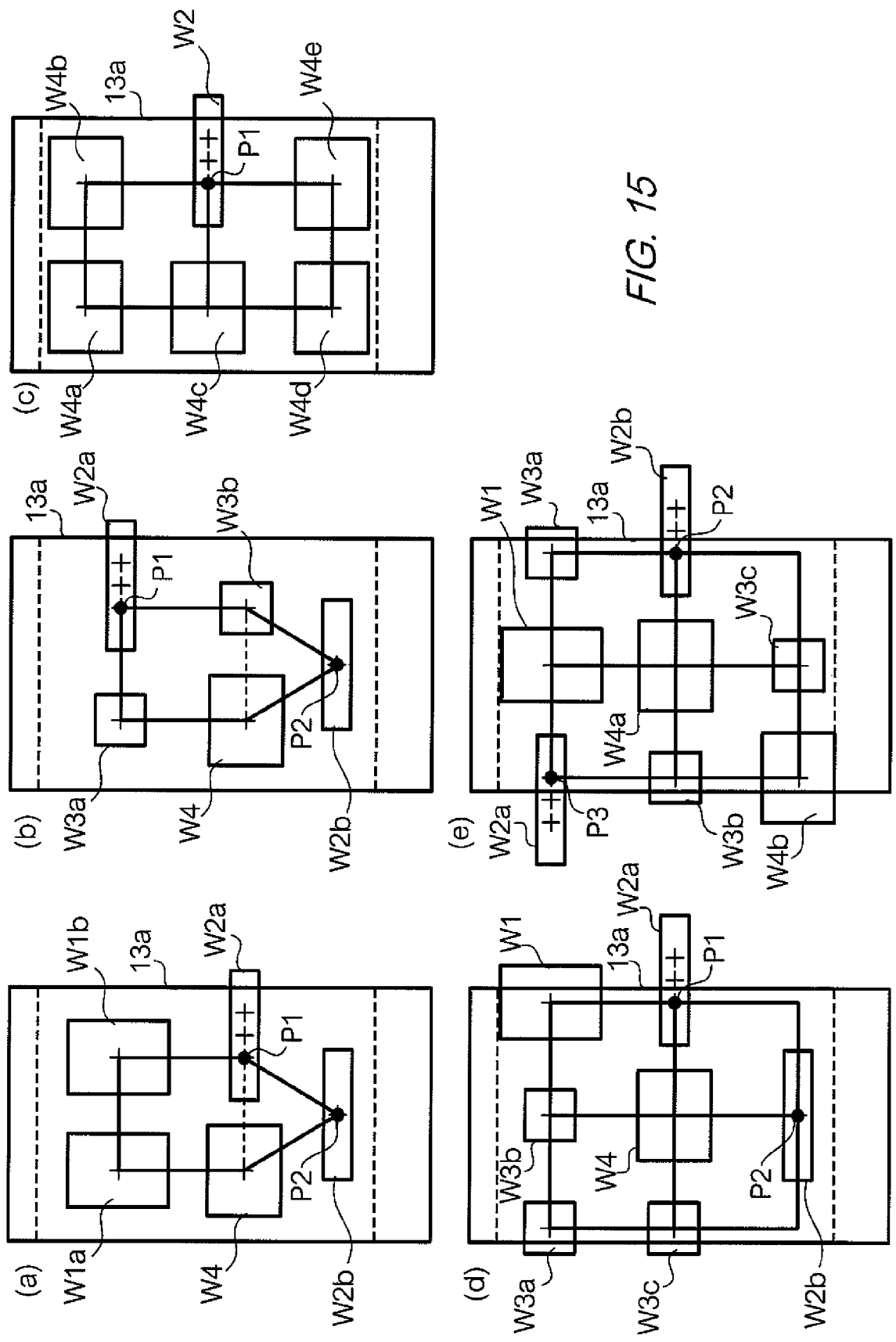
FIG. 15 is a diagram showing a mode of arrangement of windows according to Modification 2.

FIG. 15 illustrates a mode of arrangement in a case where display number N=5-8. In the example shown in FIG. 15, communication terminal device 10 arranges windows other than the bar-type windows based on a center point of each window, but with regard to the bar-type windows, selects varying points for the same reason as that described above. In this way, even when display number N is large, it is made easy to arrange the windows within display area 13a.

It is to be noted that with regard to a window of a type other than the bar-type window, multiple points may be predetermined as reference points used for determining the position of the window. In this case, communication terminal device 10 may select a point that maximizes a displayed area of the window. For example, in a case of a vertically elongated window, multiple points are arranged in the vertical direction, and when the window is arranged in an upper part of display area 13a, communication terminal device 10 selects the lowermost one of the points. Conversely, in a case where the window is arranged in a lower part of display area 13a, communication terminal device 10 selects the uppermost point. In a case where the window is positioned near the center, communication terminal 10 selects a point close to a center of the window. In essence, it can be said that it is preferred to determine arrangement of a window based on one of the multiple points determined in the window that is closest to a center of display area 13a. Also, though the number of the multiple points is three in this example, it may be any number that is equal to two or larger.

In Modification 2, if a window overlaps another window when arrangement of the windows is performed by use of one of the multiple points, communication terminal device 10 may determine arrangement by use of another point. In this case, communication terminal device 10 selects a point that will increase a distance to the other window with which overlapping occurred, and arranges the window anew.

3-3. Modification 3

The positions at which windows are arranged are not limited to vertices of a polygon. In the above embodiment, when display number N of the windows is equal to or smaller than a threshold value, communication terminal 10 arranges each window such that the center point of the window coincides with a vertex of a polygon determined in accordance with the number of the windows. However, in Modification 3, communication terminal 10 arranges an additional window such that the center point of the window coincides with a point at which diagonal lines each connecting vertices of a polygon intersect one another. It is to be noted here that a diagonal line indicates a line segment that connects the center points of windows that are not adjacent to each other, among the windows arranged to form a polygon.

FIGS. 16(a)-(d) are diagrams showing a mode of arrangement in a case where display number N=5. For example, in a mode of arrangement shown in FIG. 16(a), the windows are arranged such that, when center points of adjacent ones of vertically elongated windows W1a, W1b, W1c, and W1d are connected by line segments, a figure formed by these line segments represents a quadrangle (rectangle) D10. That is, in this example, arrangement is made such that four windows ("4" is derived by subtracting "1," which is a number of window(s) positioned at an intersection(s), from display number N=5) form a quadrangle. In quadrangle D10, diagonal line L1 is a line segment connecting the center points of windows W1b and W1c, which are not adjacent to each other. Diagonal line L2 is a line segment connecting the center points of windows W1a and W1e. Intersection point Px is a point at which diagonal lines L1 and L2 intersect each other. In Modification 3, communication terminal device 10 arranges window W1c, which is a window additional to the windows arranged to form quadrangle D10, such that its center point coincides with intersection point Px.

When N number of windows are arranged to form an N-sided polygon, a region in which no window is arranged tends to be formed in a vicinity of the center of display area 13a. However, by adopting the mode of arrangement of Modification 3, it is possible to use such a region effectively. It is to be noted that, though explanation has been made here of the case where display number N=5, even when N≥6, the same mode of arrangement may be adopted because diagonal lines intersect one another in such cases also. Further, the center point of a window arranged in a region inside the polygon does not have to coincide with an intersection point between multiple diagonal lines. There may be a gap between the center point and the intersection point. When communication terminal device 10 arranges a window in a region inside a polygon, an advantage of utilizing the region effectively can be achieved.

Namely, in a case where display number N determined by display number determination unit 220 is equal to or larger than "4" and equal to or smaller than a threshold value ("5"), display control unit 230 may arrange k number of windows from N number of windows inside a polygon. For example, display control unit 230 may arrange (N-k) number of windows at positions corresponding to the vertices of (N-k)-sided polygon, while arranging the remaining k number of windows inside the polygon. For example, in cases where N 6, there is a possibility that two or more intersection points between diagonal lines may be created. In such a case, arrangement of windows may be performed using selected one(s) of these intersection points as a reference(s). Alternatively, it is possible to arrange a window at each of these intersection points.

Figure 16:
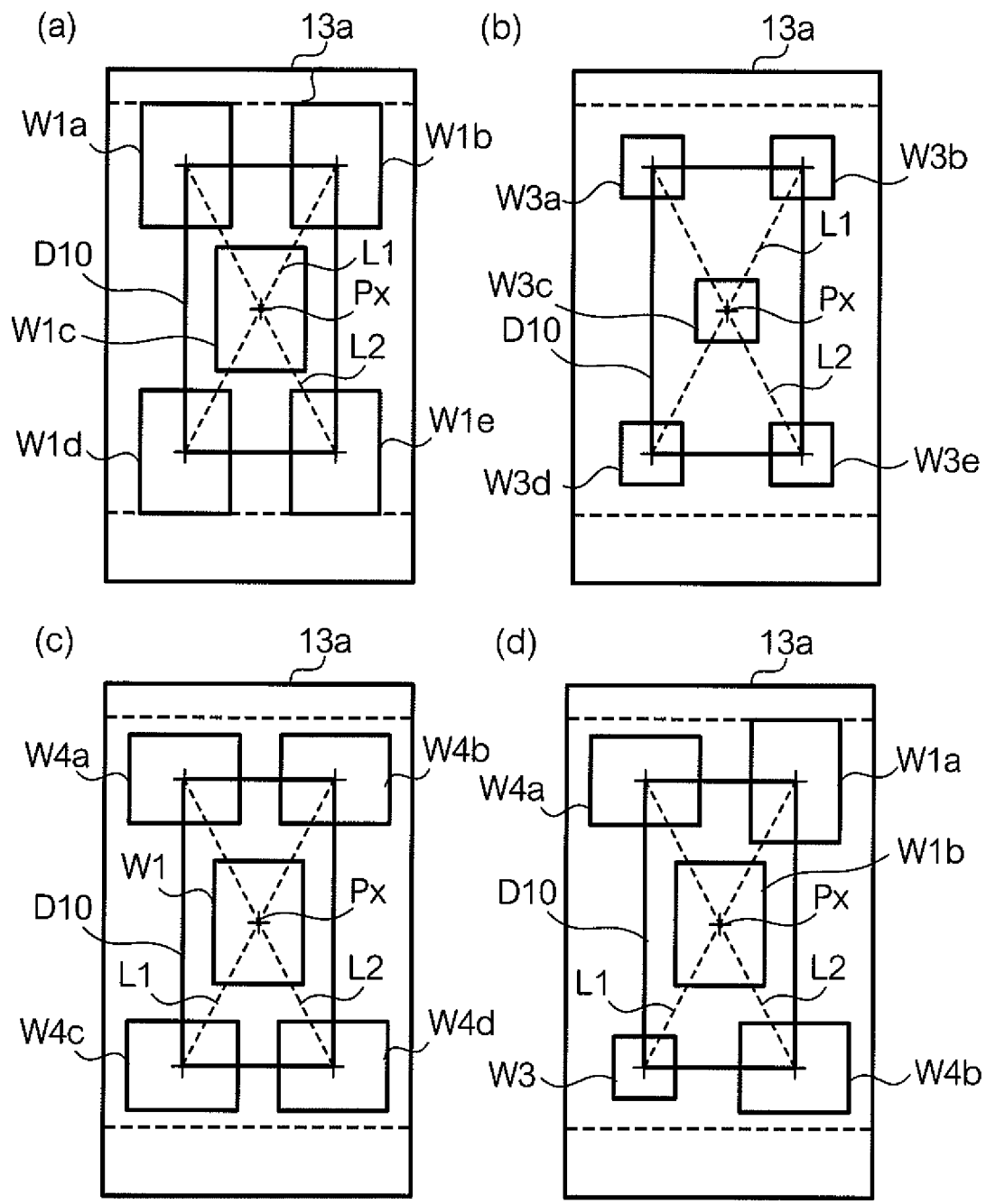
FIG. 16 is a diagram showing a mode of arrangement of windows according to Modification 3.

Communication terminal device 10 may determine which of the mode of arrangement described in Modification 3 or the mode of arrangement described in the exemplary embodiment is used, based on a type of a window. For example, as shown in FIG. 16(b), the smaller the size of each window forming a polygon is, the larger the region inside the polygon tends to be, and thus, the easier the windows can be arranged so as not to overlap one another. On the other hand, in a case where the size of each window forming a polygon is large or the size of a window to be arranged in a region inside the polygon is large, the window arranged in the region inside the polygon tends to overlap one or more of the windows arranged to form the polygon, and thus, it may be preferred to adopt the mode of arrangement of the exemplary embodiment.

3-4. Modification 4

In the above embodiment, one mode of arrangement is determined for each display number N of the windows. However, it is possible that multiple modes of arrangement (that is, multiple kinds of polygon) are determined for each display number N. In this case, it is preferred that communication terminal device 10 selects a mode of arrangement that allows each window in its entirety to be contained within display area 13a by taking into account a type(s) of the windows. In a case where it is impossible to contain each window in its entirety within display area 13a, it is preferred that communication terminal device 10 arranges the windows using a mode of arrangement that maximizes a total sum of the areas of displayed parts of the windows (or an average of the area of a displayed part of each window). For example, in the exemplary embodiment, explanation is made of an example in which, in a case where N=3, the windows are arranged by use of the vertices of a regular triangle as references. However, in the case where N−3, a triangle used for arrangement may be selected based on a type(s) or a size(s) of a window(s) from among a plurality of triangles such as regular triangles having different sizes, an isosceles triangle, and so on.

Also, a window may have a variable size, and in this case, it is preferred that each time the size of the window is changed, communication terminal device 10 selects the optimum one of multiple modes of arrangement, and arranges each window accordingly.

3-5. Modification 5

When display number N is large, as shown in FIGS. 9 and 10, a window positioned near an end portion of display area 13a may not be contained within display area 13a. In such a case, communication terminal device 10 may arrange a window that is desired to be displayed in its entirety, in a vicinity of the center of display area 13a, and may arrange a window, a part of which does not have to be displayed, near an end portion of display area 13a. In this configuration, communication terminal device 10 has a user select a window whose entire part should be displayed, for example. First, communication terminal device 10 displays windows in a given mode of arrangement, and upon selection of a window by a user, changes the position of the window with that of a window that is positioned in a vicinity of the center of display area 13a and that is displayed in its entirety. In this case, communication terminal device 10 may have a user select a window that should be moved to be near an end portion of display area 13a. Alternatively, communication terminal device 10 may determine an arrangement based on priorities of widgets. In this case, a priority is predetermined for each widget. Communication terminal device 10 arranges a window with a higher priority in a vicinity of the center of display area 13a. With regard to a mode of designation of priorities, besides designation performed by a user, designation may be performed by communication terminal device 10 based on frequency of use of each widget, a period in which each widget is executed, or the like.

3-6. Modification 6

In the above embodiment, communication terminal device 10 determines an arrangement position of each window based on the center point of the window. However, the point used for determination of an arrangement position is not limited to the center point and may be any point determined for each window. Also, the type of a window is not limited to those illustrated in the exemplary embodiment. For example, communication terminal device 10 may display a bar-type window having a direction of elongation aligned with the vertical direction. In this case, in Modification 1, control unit 11 arranges the windows along the horizontal direction, which is a direction perpendicular to the direction of elongation of the bar-type window.

Also, in the exemplary embodiment, explanation is made of a case where maximum number Nm of display number N of the window is equal to eight. However, Nm may be larger or smaller than eight. As is described in the exemplary embodiment, maximum number Nm is predetermined based on a relationship between a capacity of a work area in RAM 11c and a capacity necessary for execution of each widget, a size of display area 13a, or the like. Therefore, in a case of display area 13a having a larger size, for example, even when a larger number of windows are displayed simultaneously, they can be contained within display area 13a.

Further, in the exemplary embodiment, display unit 13 includes display area 13a that has a somewhat larger length in the vertical direction than in the horizontal direction as is shown in FIG. 4 and other drawings. Communication terminal device 10 arranges the windows in rows extending in the vertical direction of display area 13a. However, the size and the shape of display area 13a in the exemplary embodiment are given as a mere example, and the display area may be a rectangular area having a horizontal length larger than a vertical length. In this case, the windows can be contained within display area 13a more easily if the windows are arranged in a row(s) extending in the horizontal direction. Thus, by arranging the windows such that they form a row(s) extending in a predetermined direction in the display area, advantageous effects of the present invention can be achieved.

Moreover, the polygons (triangle D3, square D4, and pentagon D5) for determining a mode of arrangement of windows described in the exemplary embodiment are given merely as examples, and such a polygon may have a different size or a different shape to that of these polygons. Also, the threshold value for determining a mode of arrangement is a value that can be set appropriately based on the size of display area 13a or the like.

Reception unit 210 in the exemplary embodiment receives from operation unit 14 an instruction to execute a widget or an instruction to terminate a widget being executed, i.e., an instruction to increase or decrease the display number of the windows. However, the reception unit may receive an instruction to execute all widgets to be executed simultaneously. In this case, the reception unit will receive an instruction to display all windows to be displayed on display unit 13, and the display number determination unit will determine display number N based on the instruction received by the reception unit.

3-7. Modification 7

In the present invention, a window may have plural display aspects when the window is selected. In such a case, the multiple display aspects may switch in stages in response to predetermined operations.

In this case, depending on whether the window is "selected" or "not selected," communication terminal device 10 executes different processes. For example, with regard to the clock widget described in the foregoing, when the window is not selected, communication terminal device 10 causes the time and date to be displayed in a predetermined style, and when the window is selected, communication terminal device 10 causes the time and date to be displayed in a style of display different to that when the window is not selected. This can be achieved, for example, in a manner that communication terminal device 10 causes only the time to be displayed when the window is not selected and causes the date and the day of the week to be displayed in addition to the time when the window is selected. With regard to the other windows also, communication terminal device 10 may change the mode of display of each window depending on whether the window is selected or not selected.

3-8. Modification 8

A window in the present invention is not limited to a display area assigned to a "widget" as described in the above embodiment, and may be a display area assigned to another application (for example, a native application). Similarly, a widget is not limited to a Java application, and may be implemented as another application. Further, although in the above embodiment, plural windows are displayed as a result of execution of a window display application, which is a Java application, display of plural windows may be achieved by another application, such as an OS.

Further, a widget may obtain information via means other than wireless communication unit 12. For example, in a case where an information-processing device according to the present invention is equipped with an IC tag, a widget may obtain information stored in the IC tag. Also, in a case where an information-processing device according to the present invention has a locationing function such as that using a GPS (Global Positioning System) or the like, a widget may obtain position information (longitude, latitude, distance from a predetermined location, etc.) by using the locationing function.

3-9. Modification 9

An object image in the present invention is not limited to a window, and may be an icon representing a shortcut to a specific application or a thumbnail image of an image or a document file stored in EEPROM 11d of communication terminal device 10, for example. Further, an object image in the present invention may be a Web clip, which is derived by conversion of a Web page into an icon, or an icon representing a shortcut to a specific telephone number. An object image in the present invention may be a still image or a moving image, and include characters and/or symbols. In essence, an object image in the present invention may be any image, so long as it is an image that is displayed on display unit 13 of communication terminal device 10 and can be specified by operation of operation unit 14 by a user, and control unit 11 performs a process in accordance with the specified image. Concretely, in a case where an object image is a thumbnail image, for example, when the thumbnail image is specified, control unit 11 performs a process of displaying an image represented by the specified thumbnail image on display unit 13. Also, in a case where an object image is a Web clip, for example, when the Web clip is specified, control unit 11 performs a process of accessing and displaying a Web page represented by the specified Web clip.

3-10. Modification 10

In the above embodiment, a user inputs instructions by operating keys of operation unit 14. However, the present invention is not limited to such an embodiment. For example, soft buttons corresponding to keys of operation unit 14 may be displayed on display unit 13, such that input of instructions can be performed by operation of these soft buttons. Further, if communication terminal device 10 has a touch panel, the touch panel may receive operation of the soft buttons.

3-1. Modification 11

In the above embodiment, control unit 11 may be considered as corresponding to an information-processing device according to the present invention, or communication terminal device 10 may be considered as corresponding to the information-processing device. When communication terminal device 10 is considered to be serving as an information-processing device according to the present invention, a reception means, a determination means, and a display control means are implemented by cooperation of control unit 11 and operation unit 14. It is to be noted that an operation in the present invention can be input by means other than pressing of keys, such as speech recognition.

The present invention may change an arrangement of images such as icons or the like instead of windows. In other words, a "window" in the present invention is a concept that can include an image such as an icon or the like.

Further, in the above embodiment, the present invention is applied to a mobile phone. However, the present invention may be applied to another electronic device. The present invention may be applied to a variety of information-processing devices; namely, a communication terminal device such as a PDA (Personal Digital Assistance) or the like, a camera, a portable music player, a portable game player, and so on.

Furthermore, each of the functions performed in the above-described communication terminal device 10, which are shown in FIG. 3, may be implemented by a combination of programs, or may be implemented by cooperation of hardware resources. For example, an operation corresponding to display control unit 230 may be carried out by a program different to that for carrying out operations of reception unit 210 and display number determination unit 220. Alternatively, hardware resources carrying out these operations may be different from each other.

What is claimed is:

1. An information-processing device comprising:
   a reception means for receiving an instruction to display an object image(s) on a display means for displaying an image, via an operation means for receiving an operation;
   a determination means for determining a number of the object image(s) when the object image(s) is displayed on the display means in response to the instruction; and
   a display control means for, in a case where the number determined by the determination means is equal to or larger than three and equal to or smaller than a threshold value, arranging and displaying the object images at positions such that, when points respectively determined in adjacent object images are connected by line segments, a figure formed by the line segments represents a polygon having a number of vertices corresponding to the determined number, and, in a case where the number determined by the determination means exceeds the threshold value, arranging and displaying the object images in rows extending in a predetermined direction in a display area of the display means.

2. The information-processing device according to claim 1, wherein the display control means:
   when a predetermined number or more of object images having a direction of elongation are displayed in the case where the number determined by the determination means is equal to or larger than three and is equal to or smaller than the threshold value, arranges and displays the object images in a row(s) along a predetermined direction in the display area of the display means, instead of arranging the object images at such positions that the object images form a polygon; and
   when a predetermined number or more of object images having a direction of elongation are displayed in the case where the number determined by the determination means exceeds the threshold value, arranges and displays the object images having a direction of elongation in a row(s) along a predetermined direction in the display area of the display means, and arranges and displays the other object image(s) in a row(s) along the predetermined direction separately from the object images having a direction of elongation.

3. The information-processing device according to claim 1, wherein in a case where the number determined by the determination unit is equal to or larger than four and is equal to or smaller than the threshold value, the display control means arranges and displays three or more object images at positions such that, when points predetermined in the three or more object images are connected by line segments, a figure formed by the line segments represents a polygon having a number of vertices same as the number of the three or more object images, and arranges and displays an object image other than the three or more object images in a region inside the polygon.

4. The information-processing device according to claim 1, wherein
   a plurality of points are determined in the object image, and
   the display control means changes the point determined in the object image depending on a position in the display area of the display means at which the object image is arranged.

5. The information-processing device according to claim 4, wherein the display control means arranges and displays the object images at positions such that the polygon is formed by line segments defined by use of one of the determined plurality of points in the object image that is close to a center of the display area of the display means.

6. The information-processing device according to claim 4, wherein the display control means arranges and displays the object images at positions such that the polygon is formed by line segments defined by use of one of the determined plurality of points in the object image that results in a large displayed area of the object image.

7. A non-transitory computer-readable medium encoded with a computer program, the computer program causing a computer to perform steps of:
   receiving an instruction to display an object image(s) on a display means for displaying an image, via an operation means for receiving an operation;
   determining a number of the object image(s) when the object image(s) is displayed on the display means in response to the instruction; and
   in a case where the number determined by the determination means is equal to or larger than three and equal to or smaller than a threshold value, arranging and displaying the object images at positions such that, when points respectively predetermined in adjacent object images are connected by line segments, a figure formed by the line segments represents a polygon having a number of vertices corresponding to the determined number, and, in a case where the number determined by the determination means exceeds the threshold value, arranging and displaying the object images in rows extending in a predetermined direction in a display area of the display means.

* * * * *